United States Patent
Yang et al.

(10) Patent No.: US 9,774,264 B2
(45) Date of Patent: Sep. 26, 2017

(54) CONTROL CIRCUIT AND CONTROL METHOD FOR SWITCHING POWER SUPPLY OPERATING IN QUASI RESONANT MODE

(71) Applicant: Silergy Semiconductor Technology (Hangzhou) LTD, Hangzhou, ZheJiang Province (CN)

(72) Inventors: Xiaoyu Yang, Hangzhou (CN); Yongjiang Bai, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 15/230,586

(22) Filed: Aug. 8, 2016

(65) Prior Publication Data

US 2017/0063241 A1 Mar. 2, 2017

(30) Foreign Application Priority Data

Aug. 26, 2015 (CN) .......................... 2015 1 0530841

(51) Int. Cl.
*H02M 3/335* (2006.01)
*H02M 1/00* (2006.01)

(52) U.S. Cl.
CPC .................. *H02M 3/33507* (2013.01); *H02M 2001/0058* (2013.01)

(58) Field of Classification Search
CPC ......... H02M 3/33507; H02M 3/33515; H02M 3/33538; H02M 3/33546; H02M 3/33576; H02M 3/33592; H02M 3/33523; H02M 1/4225; H02M 3/156
USPC ......... 363/21.01, 21.05, 21.12, 21.13, 21.14, 363/21.16, 21.18, 79, 89
See application file for complete search history.

(56) References Cited

U.S. PATENT DOCUMENTS

| | | | |
|---|---|---|---|
| 8,890,502 B2 | 11/2014 | Tournatory | |
| 8,964,417 B1 | 2/2015 | Shen et al. | |
| 2012/0230064 A1* | 9/2012 | Yang | H02M 3/33523 363/21.15 |
| 2013/0083564 A1 | 4/2013 | Bai et al. | |
| 2014/0246988 A1* | 9/2014 | Chen | H05B 33/0815 315/223 |

* cited by examiner

*Primary Examiner* — Adolf Berhane
*Assistant Examiner* — Afework Demisse
(74) *Attorney, Agent, or Firm* — Michael C. Stephens, Jr.

(57) ABSTRACT

A control circuit can include: an output current sampling circuit configured to sample a current through a power switch of a switching power supply operating in a quasi-resonant mode, and to generate an output current feedback signal that represents an output current of the switching power supply; and a valley locking circuit configured to receive the output current feedback signal and a plurality of valley switching threshold voltages, where the valley locking circuit is switched to a corresponding valley from a valley currently being locked when the output current feedback signal is increased or reduced to one of the plurality of valley switching threshold voltages.

10 Claims, 6 Drawing Sheets

CONTROL CIRCUIT AND CONTROL METHOD FOR SWITCHING POWER SUPPLY OPERATING IN QUASI RESONANT MODE

RELATED APPLICATIONS

This application claims the benefit of Chinese Patent Application No. 201510530841.8, filed on Aug. 26, 2015, which is incorporated herein by reference in its entirety.

FIELD OF THE INVENTION

The present invention generally relates to the field of switching power supplies, and more particularly to control circuits and methods for a switching power supply operating in a quasi-resonant mode.

BACKGROUND

Flyback switching power supplies are widely used in DC/DC power converters of relatively small power levels. When a flyback type of switching power supply operates in a quasi-resonant mode, the conversion efficiency may be relatively high and electromagnetic interference (EMI) may be relatively low since a power switch is turned on once the drain voltage reaches a valley value, and thus such a control method is widely used. However, valley frequency hopping can be a large problem of the quasi-resonant mode for some load characteristics. That is, the power switch can be alternately turned on at two adjacent valley values, and associated noise may be brought in when the frequency at which the power switch is alternately turned on at such valley values is in the audible frequency range.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one embodiment, a control circuit can include: (i) an output current sampling circuit configured to sample a current through a power switch of a switching power supply operating in a quasi-resonant mode, and to generate an output current feedback signal that represents an output current of the switching power supply; and (ii) a valley locking circuit configured to receive the output current feedback signal and a plurality of valley switching threshold voltages, where the valley locking circuit is switched to a corresponding valley from a valley currently being locked when the output current feedback signal is increased or reduced to one of the plurality of valley switching threshold voltages.

In one embodiment, a method of controlling a switching power supply operating in a quasi-resonant mode can include: (i) sampling a current through a power switch of the switching power supply, to generate an output current feedback signal that represents an output current of the switching power supply; (ii) receiving the output current feedback signal and a plurality of valley switching threshold voltages; and (iii) switching a valley being locked to another valley when the output current feedback signal is increased or reduced to one of the plurality of valley switching threshold voltages.

Figure 1:
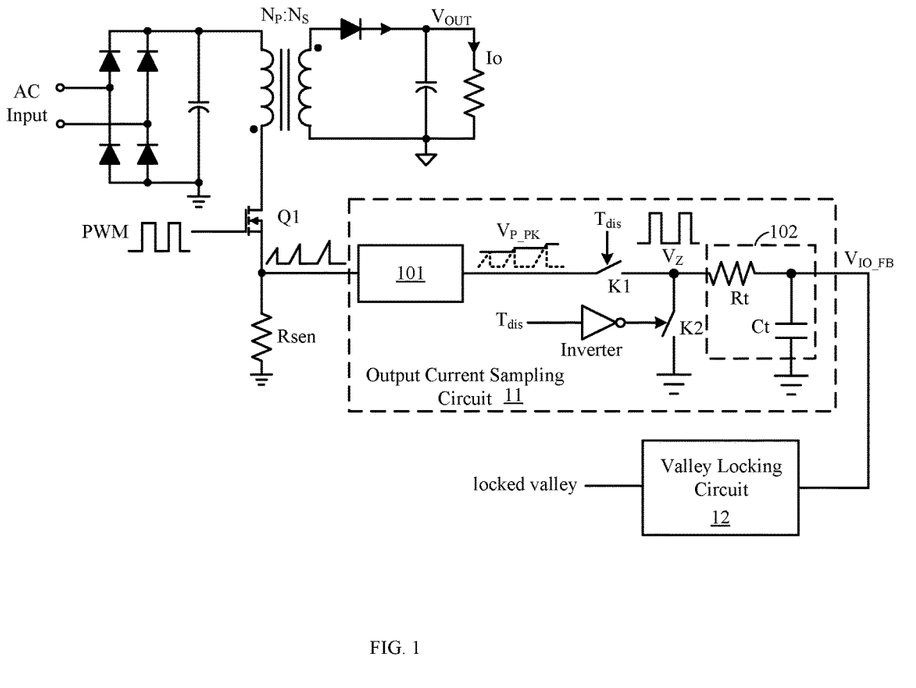
FIG. 1 is a schematic block diagram of an example control circuit of a switching power supply in a quasi-resonant mode, in accordance with embodiments of the present invention.

Referring now to FIG. 1, shown is a schematic block diagram of an example control circuit of a switching power supply in a quasi-resonant mode, in accordance with embodiments of the present invention. In this particular example, the switching power supply is a flyback converter that includes a rectifier bridge, a transformer with primary winding $N_P$ and secondary winding $N_S$, a freewheeling diode, and power switch Q1. The rectifier bridge may be used to receive an external input voltage, and to generate a DC input voltage after rectification. Those skilled in the art will recognize that the flyback converter may also include a control circuit (not shown) for controlling power switch Q1. For example, the control circuit can control the switching operations of the power switch in response to a feedback signal that represents an output voltage, such that the switching power supply may generate a substantially stable output signal.

Figure 2:
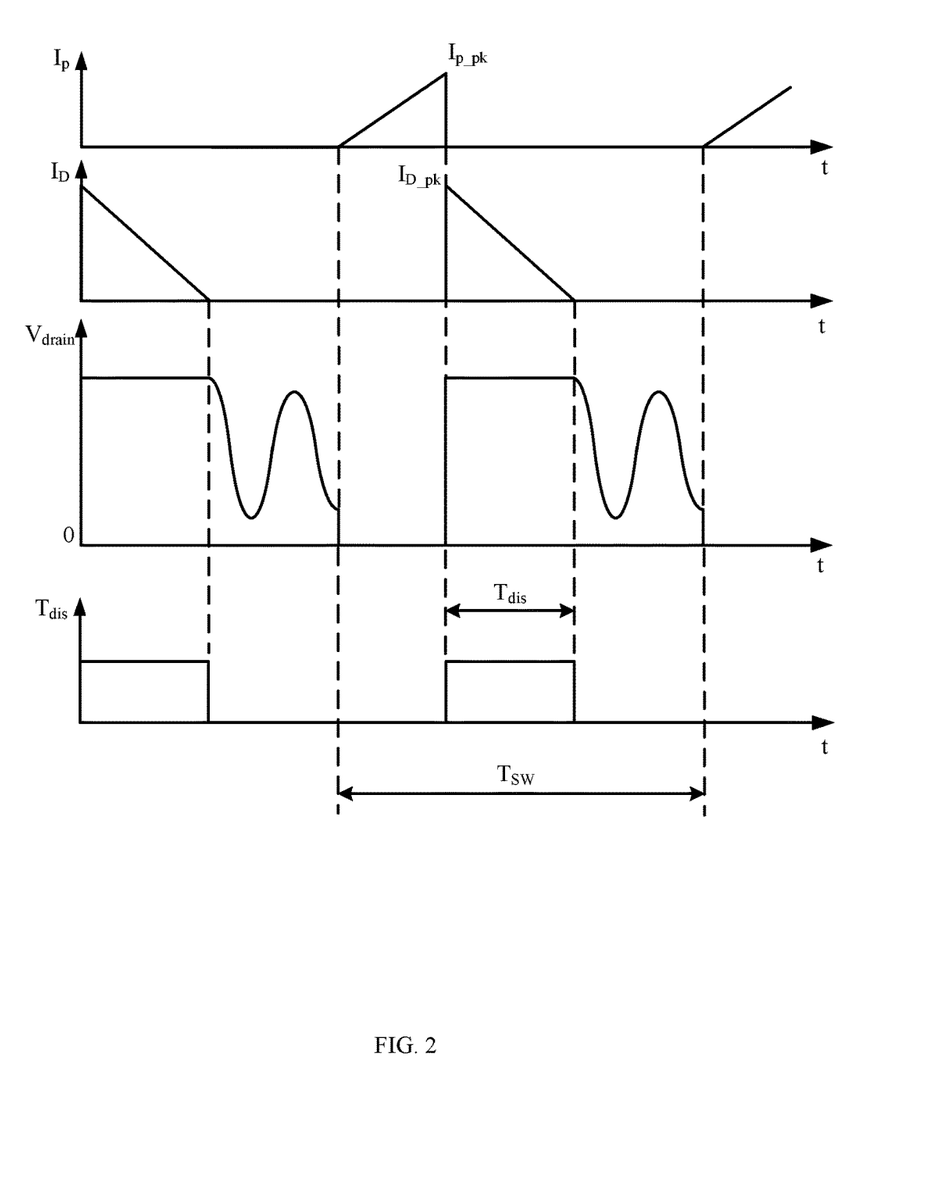
FIG. 2 is a waveform diagram of example quasi-resonant mode operation, in accordance with embodiments of the present invention.

Referring now to FIG. 2, shown is a waveform diagram of example quasi-resonant (QR) mode operation, in accordance with embodiments of the present invention. In this example, $I_P$ may denote a current through the primary winding, $I_D$ may denote a current through a rectifier device at the secondary side, $V_{drain}$ may denote a drain voltage of power switch Q1, and $T_{dis}$ may denote a releasing time of energy stored in the transformer. For the example flyback converter, a source voltage of the power switch may vary when the parasitic capacitor of the power switch resonates with the resistors in the circuit. Switching losses may be largely reduced by turning on the power switch at the valley of the resonant wave. As shown, the power switch can be turned on at the second valley of the source voltage. Since the load may change (e.g., from a heavy-load to a light-load), regulation at the valley at which the power switch is turned on can adjust the operating frequency of the power switch, in order to effectively improve the efficiency.

In some approaches, the valley at which the power switch is turned on can be locked according to the feedback signal of the output voltage. That is, the valley at which the power switch is turned on may be determined by the feedback signal of the output voltage. Typically, a heavier load causes a larger feedback signal, and vice versa. When the feedback signal is divided into a plurality of sections, the power switch may be turned on at a fixed valley when the feedback signal is activated in one of the sections. In such control based on the feedback signal of the output voltage has some disadvantages, the feedback signal may have large ripples when the switching power supply does not support the function of power factor correction, or the output voltage has relatively large ripples. If the feedback signal fluctuates greatly, the above-mentioned valley locking approach may not be able to guarantee reliable valley lock out, and thus "mis-locking out" may occur.

In certain embodiments, an approach of locking the valley according to a feedback signal of an output current is provided. As shown in the example of FIG. 1, the flyback converter may also include output current sampling circuit 11 and valley locking circuit 12. Output current sampling circuit 11 can include peak value sample and hold circuit 101, a chopper circuit that includes switches K1 and K2, and filter circuit 102. Switch K1 can be controlled by timing signal $T_{dis}$, and switch K2 can be controlled by an inverted version of timing signal $T_{dis}$. Filter circuit 102 may include filter resistor Rt and filter capacitor Ct. Peak value sample and hold circuit 101 may be used to sample a current signal of power switch Q1, to generate peak value sampling signal $V_{P\_PK}$.

For example, peak value sample and hold circuit 101 may sample a current signal of power switch Q1 via sampling resistor Rsen. Peak value sampling signal $V_{P\_PK}$ may be converted to chopped signal $V_Z$ via switches K1 and K2. Output current feedback signal $V_{IO\_FB}$ that represents the output current of the switching power supply can be generated by filtering chopped signal $V_Z$ via filter circuit 102. Also, timing signal $T_{dis}$ can be determined in response to the discharging time of the secondary winding. In one switching cycle, timing signal $T_{dis}$ may remain active (e.g., at a high level) during the discharging time of the secondary winding of the flyback converter, and may remain inactive (e.g., at a low level) after the secondary winding of the flyback converter completes discharging.

As shown in FIG. 1, peak value sample and hold circuit 101 may sample the current through the power switch by sampling resistor Rsen, and may generate peak value sampling voltage $V_{P\_PK}=I_{P\_PK} \times Rsen$. Here, $I_{P\_PK}$ is a peak value of the current through the primary winding (or the power switch), and Rsen is a resistance value of the sampling resistor. Output current feedback signal $V_{IO\_FB}$ can be determined according to the structure and operating principles of the output current sampling circuit, as in formula (1) below.

$$V_{IO\_FB} = \frac{T_{dis}}{T_W} \times I_{P\_PK} \times R_{sen} \quad (1)$$

In formula (1), $T_{dis}$ may indicate the on time of the freewheeling diode at the secondary side (e.g., the discharging time of the secondary winding), and $T_W$ can indicate one operating cycle of the switching power supply. For a flyback switching power supply, the relationship between output current Io and peak current $I_{P\_PK}$ of the primary winding can be shown as below in formula (2).

$$I_O = \frac{1}{2} \times \frac{T_{dis}}{T_W} \times \frac{N_P}{N_S} \times I_{P\_PK} \quad (2)$$

According to formulas (1) and (2), the relationship between output current Io and output current feedback signal $V_{IO\_FB}$ can be obtained as shown below in formula (3).

$$I_O = \frac{1}{2} \times V_{IO\_FB} \times \frac{N_P}{N_S} \times \frac{1}{R_{sen}} \quad (3)$$

It can be seen from formula (3) that output current feedback signal $V_{IO\_FB}$ is in direct proportion to the output current Io since turn ratio $N_P/N_S$ of the primary winding to the second winding of the transformer is a fixed value, and resistance value Rsen of the sampling resistor is also a fixed value. In this way, output current feedback signal $V_{IO\_FB}$ can be used to represent output current Io. Valley locking circuit 12 may receive output current feedback signal $V_{IO\_FB}$ and a plurality of valley switching threshold voltages. A corresponding valley signal may be locked and transferred to a logic circuit of the control circuit when the output current feedback signal reaches a level of one of the valley switching threshold voltages. In this fashion, the power switch can be controlled to be turned on when reaching the valley.

Figure 3:
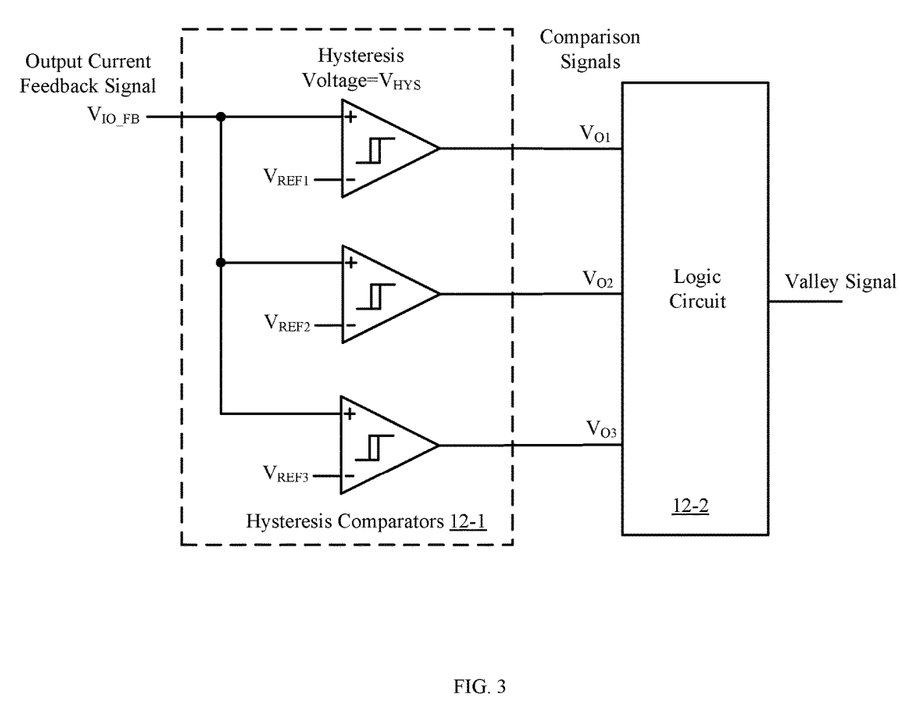
FIG. 3 is a schematic block diagram of an example valley locking circuit, in accordance with embodiments of the present invention.

Referring now to FIG. 3, shown is a schematic block diagram of an example valley locking circuit, in accordance with embodiments of the present invention. In this example, the valley locking circuit may include hysteresis comparators 12-1 and logic circuit 12-2. Here, three hysteresis comparators are described as examples, and each of the hysteresis comparators may have a first input terminal (e.g., a negative terminal) that receives a reference voltage signal, and a second input terminal (e.g., a positive terminal) that receives output current feedback signal $V_{IO\_FB}$, and an output terminal that provides a comparison signal (e.g., $V_{O1}$, $V_{O2}$ or $V_{O3}$).

Figure 4:
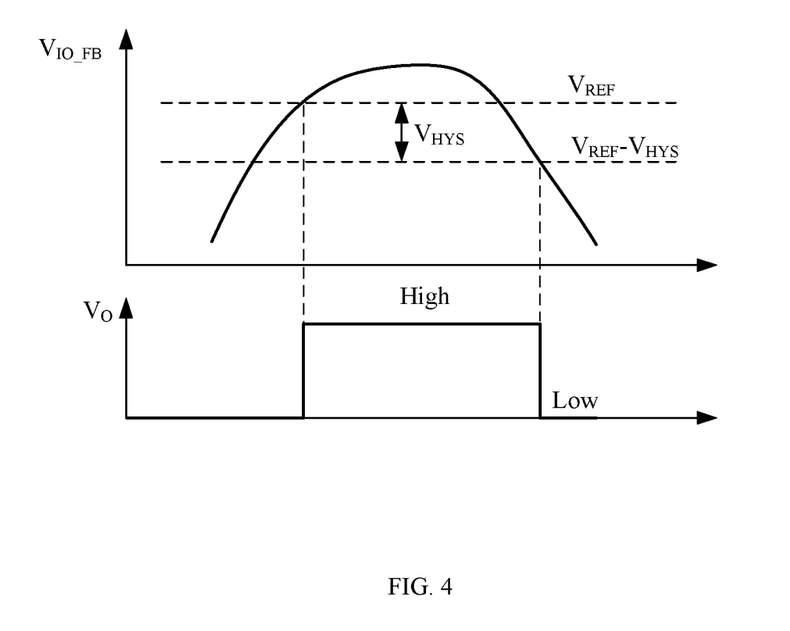
FIG. 4 is a waveform diagram of example operation of a valley locking circuit, in accordance with embodiments of the present invention.

Referring now to FIG. 4, shown is a waveform diagram of example operation of a valley locking circuit, in accordance with embodiments of the present invention. In this example, $V_{REF}$ may represent the reference voltage signal and $V_{HYS}$ may represent the hysteresis voltage of the hysteresis comparator. The hysteresis comparator may provide a comparison signal that is active (e.g., at a high level) when output current feedback signal $V_{IO\_FB}$ is increased to a level of reference voltage signal $V_{REF}$, and may provide a comparison signal that is inactive (e.g., at a low level) when output current feedback signal $V_{IO\_FB}$ is reduced to error $V_{REF-VHYS}$ between the reference voltage signal and a hysteresis voltage. Logic circuit 12-2 may receive a plurality of comparison signals, and set an appropriate valley according to the status of the comparison signals.

Figure 5:
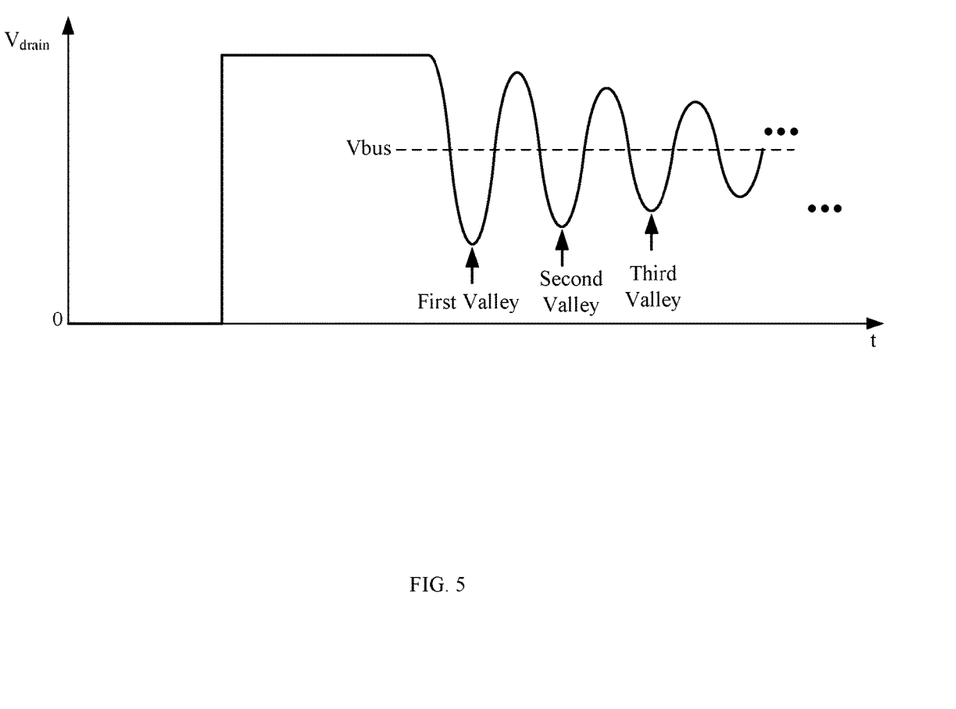
FIG. 5 is a waveform diagram of example valleys of a switching power supply in the quasi-resonant mode, in accordance with embodiments of the present invention.
Figure 6:
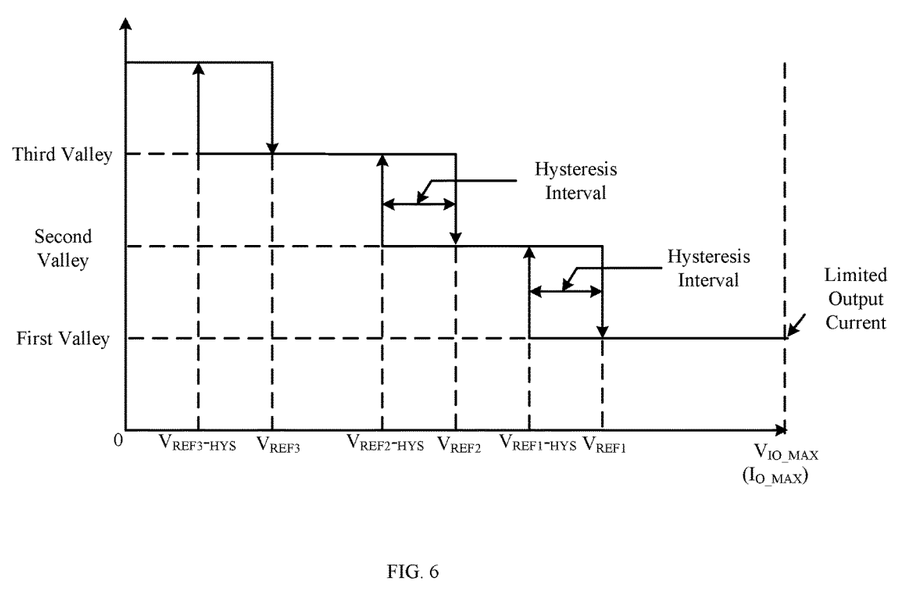
FIG. 6 is a waveform diagram of example operation when switching the valley values, in accordance with embodiments of the present invention.

Referring now to FIG. 5, shown is a waveform diagram of example valleys of a switching power supply in the quasi-resonant mode, in accordance with embodiments of the present invention. Also, FIG. 6 shows a waveform diagram of example operation when switching the valley values, in accordance with embodiments of the present invention. The following may describe the relationship between the valley switching threshold voltage and the output current according to FIGS. 5 and 6. The flyback switching power supply may enter a constant current operating mode by limiting the output current when the output current is larger than the current limiting threshold value during operation, regardless of the load variation, and thus the output current may remain substantially constant. Current limiting threshold value can be set to be larger than the rated output current (e.g., the current limiting threshold value is 1.2 times of the rated output current).

Based on the relationship of the output current feedback signal and the output current shown by formula (3), the valley switching threshold voltage in the control circuit may be set according to the maximum permitted value of the output current. As shown in FIG. 6, $V_{IO\_MAX}$ is the threshold voltage related to the maximum limited output current, and the range of the output current which is from zero to the maximum limited output current may be divided into a plurality of intervals. According to formula (3), each output current can be related to a corresponding output current feedback signal. Thus, the corresponding voltage can also be divided into a plurality of intervals with the same number as the output current. In this example, the output current and the corresponding voltage are divided into three intervals, respectively. Thus, a plurality of different switching threshold voltages (e.g., $V_{REF1}$, $V_{REF1-HYS}$, $V_{REF2}$, $V_{REF2-HYS}$, $V_{REF3}$ and $V_{REF3-HYS}$) can be obtained.

During the operating process, output current feedback signal $V_{IO\_FB}$ being sampled may be proportionally decreased along with output current Io when the load decreases, and when output current feedback signal $V_{IO\_FB}$ is reduced to threshold voltage $V_{REF1-HYS}$ the first valley being locked may be switched to the second valley by the control circuit. When output current feedback signal $V_{IO\_FB}$ is reduced to threshold voltage $V_{REF2-HYS}$, the second valley being locked may be switched to the third valley by the control circuit. Also, when output current feedback signal $V_{IO\_FB}$ is reduced to threshold voltage $V_{REF3-HYS}$, the third valley being locked may be switched to the frequency down mode. In this way, the cycle can be prolonged and power losses can be reduced at light-load or no-load state by switching to the frequency down mode.

On the other hand, output current feedback signal $V_{IO\_FB}$ being sampled may be proportionally increased along with output current Io when the load is increasing, and when output current feedback signal $V_{IO\_FB}$ is increased to threshold voltage $V_{REF3}$, the frequency down mode may be switched to the third valley by the control circuit. When output current feedback signal $V_{IO\_FB}$ is increased to threshold voltage $V_{REF2}$, the third valley being locked may be switched to the second valley by the control circuit. When output current feedback signal $V_{IO\_FB}$ is increased to threshold voltage $V_{REF1}$, the second valley being locked may be switched to the first valley by the control circuit. In this way, the switching between different valleys may be realized according to the relationship between the current feedback signal and the valley switching threshold voltage.

In particular embodiments, a plurality of valley switching threshold voltages may be obtained according to a plurality of reference voltage signals and hysteresis voltages. For example, switching threshold voltage $V_{REF1}$ may be set for switching from the second valley to the first valley, and switching threshold voltage $V_{REF1-HYS}$ may be set for switching from the first valley to the second valley. Similarly, switching threshold voltage $V_{REF2}$ may be set for switching from the third valley to the second valley, switching threshold voltage $V_{REF2-HYS}$ may be set for switching from the second valley to the third valley, switching threshold voltage $V_{REF3}$ may be set for switching from the frequency down mode to the third valley, and switching threshold voltage $V_{REF3-HYS}$ may be set for switching from the third valley to the frequency down mode.

The output signals of hysteresis comparators 12-1 may represent the comparison results of the output current feedback signal and the switching threshold voltage, logic circuit 12-2 may be used to realize the switching process between different valleys according to the status of comparison signals Vo1, Vo2 and Vo3, and the control logic may be shown as in the below Table 1.

TABLE 1

| $V_{O1}$ | $V_{O2}$ | $V_{O3}$ | |
|---|---|---|---|
| High | High | High | First Valley |
| Low | High | High | Second Valley |
| Low | Low | High | Third Valley |
| Low | Low | Low | Frequency Down Mode |

Thus, the valley locking circuit of certain embodiments may lock a corresponding valley for different output currents. As described above, the switching threshold voltages may be different when two adjacent valleys are switched with each other in two opposite directions. For example, threshold voltage $V_{REF1-HYS}$ that indicates switching from the first valley to the second valley may be different from the threshold voltage $V_{REF1}$ that indicates switching from the second valley to the first valley. Also, a hysteresis interval can be set between two different threshold voltages in order to avoid valley frequency hopping when the output current feedback signal reaches a level of the valley switching threshold voltage. After the valley switching is triggered due to the reduced output current (e.g., switching from the first valley to the second valley), the output current may be increased by voltage $V_{HYS}$. Then, the valley switching logic may be triggered, to switch from the second valley to the first valley, in order to reliably lock the valley and to avoid valley frequency hopping.

Those skilled in the art will recognize that other implementations for locking valleys can also be supported in certain embodiments. For example, corresponding valley signals may be obtained by comparing an output current feedback signal against a related switching threshold voltage on the basis of setting a plurality of valley switching threshold voltages according to output currents.

In particular embodiments, a control method for a switching power supply operating in a quasi-resonant mode can also be provided. The switching power supply may include a rectifier bridge, a transformer that includes primary winding $N_P$ and secondary winding $N_S$, a power switch, and a freewheeling diode. For example, the method can include sampling a current through the power switch, to obtain an output current feedback signal that represents an output current of the switching power supply. The method can also include receiving the output current feedback signal and a plurality of valley switching threshold voltages, and switching a valley being locked to another valley when the output current feedback signal is increased or reduced to one of the valley switching threshold voltages. For example, the switching threshold voltages can be different when two adjacent valleys are switched with each other in different directions, and a hysteresis interval may be set between two switching threshold voltages.

For example, switching the valleys can include comparing a plurality of reference voltage signals against the output current feedback signal, and generating a plurality of comparison signals. Switching the valleys can also include receiving the comparison signals, and determining a corresponding valley according to the status of the comparison signals. A plurality of valley switching threshold voltages may be obtained by comparing a plurality of reference voltage signals against the hysteresis voltages of the hysteresis comparators.

Control circuits and methods for a switching power supply operating in a quasi-resonant mode can include obtaining an output current feedback signal that represents an output current by an output current sampling circuit, comparing the output current feedback signal against the valley switching threshold voltages, and switching the current valley to a corresponding valley when the output current feedback signal reaches one of the switching threshold voltages. Particular embodiments may also provide a hysteresis interval in order to avoid valley frequency hopping when the output current feedback signal reaches the valley switching threshold voltage.

In this way, control circuits and methods of certain embodiments for a switching power supply may reliably lock the valley in the quasi-resonant mode, and regardless of the input DC voltage variation. While some valleys may be locked steadily when the load is fixed or varies in a small range, certain embodiments may substantially guarantee that the flyback switching power supply is turned on at a corresponding valley. In this way, higher efficiency can be achieved, as well as lower noise that may be caused by valley frequency hopping under some load conditions.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit, comprising:
   a) an output current sampling circuit configured to sample a current through a power switch of a switching power supply operating in a quasi-resonant mode, and to generate an output current feedback signal that represents an output current of said switching power supply; and
   b) a valley locking circuit configured to receive said output current feedback signal and a plurality of valley switching threshold voltages, wherein said valley locking circuit is switched to a corresponding valley from a valley currently being locked when said output current feedback signal is increased or reduced to one of said plurality of valley switching threshold voltages.

2. The control circuit of claim 1, wherein said switching threshold voltages are different when two adjacent valleys are switched with each other in two different directions, and a hysteresis interval is set between said two different switching threshold voltages.

3. The control circuit of claim 1, wherein said output current sampling circuit comprises:
   a) a peak value sample and hold circuit configured to sample said current through said power switch, and to generate a peak value sampling voltage;
   b) a chopper circuit comprising first and second switches, wherein said chopper circuit is configured to generate a chopped signal by chopping said peak value sampling voltage, wherein said first switch is controlled by a timing signal, and said second switch is controlled by an inverted version of said timing signal; and
   c) a filter circuit configured to receive said chopped signal, and to generate said output current feedback signal by filtering said chopped signal.

4. The control circuit of claim 3, wherein said timing signal remains active at a high level during a discharging time of a secondary winding of said switching power supply, and said timing signal remains inactive at a low level after said secondary winding of said switching power supply completes discharging.

5. The control circuit of claim 1, wherein said valley locking circuit comprises:
   a) a plurality of hysteresis comparators, each said hysteresis comparator having a first input terminal configured to receive a reference voltage signal, a second input terminal configured to receive said output current feedback signal, and an output terminal configured to provide a comparison signal such that said plurality of hysteresis comparators provide a plurality of comparison signals; and
   b) a logic circuit configured to receive said plurality of comparison signals, and to select said corresponding valley according to a status of said comparison signal.

6. The control circuit of claim 5, wherein said plurality of valley switching threshold voltages are obtained according to a plurality of said reference voltage signals and hysteresis voltages of said plurality of hysteresis comparators.

7. A method of controlling a switching power supply operating in a quasi-resonant mode, the method comprising:
   a) sampling a current through a power switch of said switching power supply, to generate an output current feedback signal that represents an output current of said switching power supply;
   b) receiving said output current feedback signal and a plurality of valley switching threshold voltages; and
   c) switching a valley being locked to another valley when said output current feedback signal is increased or reduced to one of said plurality of valley switching threshold voltages.

8. The method of claim 7, wherein said switching threshold voltages are different when two adjacent valleys are switched with each other in two different directions, and a hysteresis interval is set between said two different switching threshold voltages.

9. The method of claim 7, further comprising:
   a) comparing a plurality of reference voltage signals against said output current feedback signal to generate a plurality of comparison signals; and
   b) determining a corresponding valley according to a status of said plurality of comparison signals.

10. The method of claim 9, wherein a plurality of said valley switching threshold voltages are obtained according to said plurality of reference voltage signals and hysteresis voltages of a plurality of hysteresis comparators.

* * * * *